Figure 1:
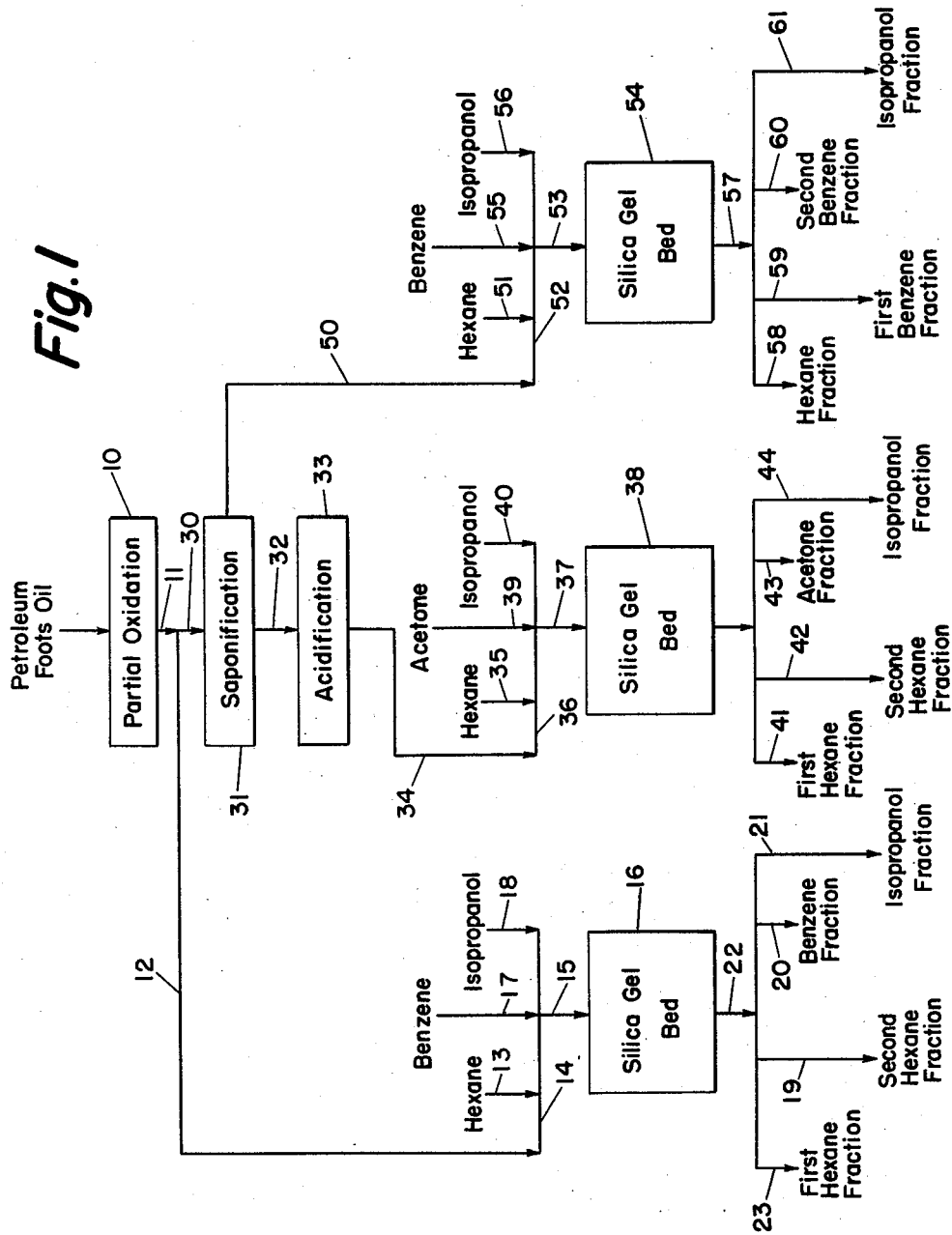

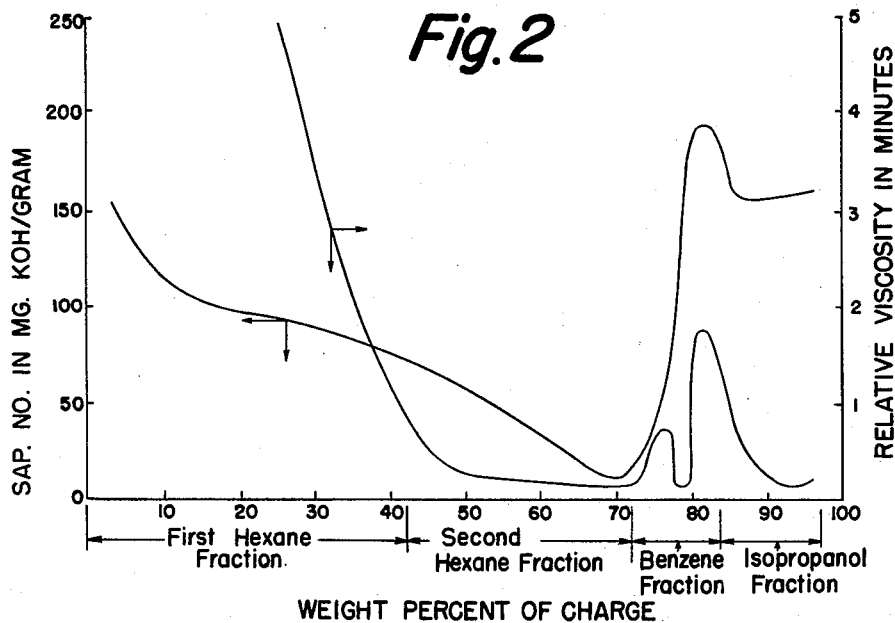
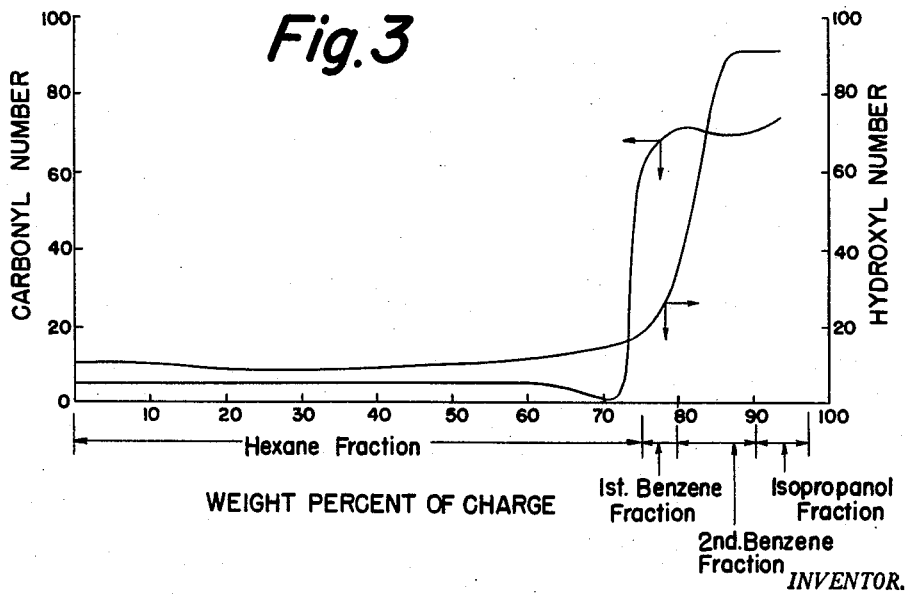

United States Patent Office 2,905,704
Patented Sept. 22, 1959

2,905,704

TREATMENT OF OXIDATION PRODUCTS WITH SOLID ADSORBENTS

Alfred E. Hirschler, Drexel Hill, Pa., assignor to Sun Oil Company, Philadelphia, Pa., a corporation of New Jersey Application October 27, 1953, Serial No. 388,593

12 Claims. (Cl. 260—452)

This invention relates to adsorbent-desorbent treatment of liquid oxidation product mixtures obtained in liquid phase partial oxidation of hydrocarbon materials.

It is known in the art to partially oxidize hydrocarbon materials, e.g. petroleum fractions, to obtain carboxylic acids and other oxidation products. Generally, the oxidation product mixtures contain unoxidized hydrocarbons, carboxylic acids, and unsaponifiable oxidation products such as alcohols, ketones, etc. The complexity of the oxidation product presents an obstacle to the satisfactory commercial use thereof, and prior methods of separation have not been entirely satisfactory for the concentration of desired types of constituents.

The present invention provides advantageous separations of different types of constituents of product mixtures obtained in liquid phase oxidation of hydrocarbon materials. According to the present invention, the product mixture, or the saponifiable portion thereof, or the unsaponifiable portion thereof is contacted with a solid adsorbent, and the adsorbent is subsequently contacted with an organic liquid desorbent to obtain a plurality of separate desorbate fractions containing different constituents of the original charge material.

In operation according to the invention, the adsorbent which has been contacted with oxidation product charge material is contacted with organic desorbent having adsorption index as subsequently defined within the range from 0 to 200. Then the adsorbent is contacted with additional organic desorbent having adsorption index of at least 30 and at least as great as the adsorption index of the previous desorbent. The two desorbents may be merely two portions of the same desorbent, e.g. alphamethyl naphthalene, whose adsorption index (45.4) is within the range from 30 to 200, or they may be two different desorbents, e.g. benzene, whose adsorption index (24) is within the range from 0 to 200, followed by isopropanol, whose adsorption index (260) is greater than 30 and greater than that of benzene. In its simplest form, the invention involves the use of a single desorbent continuously contacted with the adsorbent, at least two separate portions of the desorbent effluent being removed.

The present invention, in one embodiment, involves the treatment of the entire oxidation product mixture to obtain a division of the carboxylic acid constituents into at least two different fractions having varying properties and varying suitability for certain uses.

In another embodiment, the present invention involves the separate treatment of the saponifiable or of the unsaponifiable portion of the oxidation product mixture. In treatment of the saponifiable portion, a division of the carboxylic acid constituents into at least two fractions is obtained, similarly to the treatment of the entire oxidation product. In treatment of the unsaponifiable portion of the oxidation product mixture, at least two fractions are recovered, a separation of a relatively less strongly adsorbed fraction of the oxidized material in the unsaponifiable portion from a relatively more strongly adsorbed fraction of that oxidized material being obtained. Such separation, it is noted, may also occur concurrently with separation of the carboxylic acids into various fractions when the entire oxidation product mixture is treated according to the invention.

The invention will be further described with reference to the attached drawings of which Figure 1 illustrates several embodiments of the invention; Figures 2 and 3 are graphs showing properties of various fractions obtained according to the invention. In the process illustrated in Figure 1, petroleum foots oil is partially oxidized, in a manner known in the art, in partial oxidation zone 10. The liquid oxidation product mixture, having saponification number generally in the range from 50 to 150, can be treated in its entirety by passage through lines 11 and 12, admixture with hexane as solvent introduced through line 13, and introduction through lines 14 and 15 into treating zone 16 containing a compact bed of silica gel adsorbent solid particles. After a desired amount of this charge material is introduced, additional hexane can be introduced as desorbent liquid. Following introduction of the additional hexane, benzene as desorbent is introduced through line 17. After introduction of the desired amount of benzene, isopropanol is introduced through line 18.

The three desorbents used have increasing desorptive activity in the order of their introduction. Hexane has an adsorption index of about 0 for silica gel, adsorption index being defined in the manner set forth in U.S. Patent 2,441,572 to Alfred E. Hirschler. Benzene has an adsorption index of about 24 for a typical silica gel, indicating that it is more strongly adsorbed than hexane on silica gel, and that it therefore has greater activity in desorbing, e.g. displacing, previously adsorbed material from silica gel. Isopropanol has an adsorption index of about 260 for a typical silica gel, indicating greater desorptive activity than for either hexane or benzene.

The first effluent from treating zone 16 is a solution in hexane of the least strongly adsorbed constituents of the oxidation product mixture. As subsequently shown in the examples, these constituents surprisingly include relatively high molecular weight saponifiable constituents as well as unsaponifiable materials. The first effluent is removed through lines 22 and 23. Subsequent effluent material comprising more strongly adsorbed constituents of the oxidation product mixture dissolved in hexane is removed through line 19. This effluent material has substantially lower viscosity, on the solvent-free basis, than the effluent material removed through line 23.

Subsequent effluent material comprising a solution of oxidation product constituents including relatively low molecular weight saponifiable materials in benzene is removed through line 20, and a last effluent material comprising a solution of oxidation product constituents including relatively low molecular weight saponifiable material in isopropanol is removed through line 21.

Solvent is removed from each of the effluent materials by means not shown to obtain solvent-free fractions of the original oxidation product mixture. Each of the latter fractions contains unsaponifiable material; in the earlier effluent fractions, the unsaponifiable material is mainly unoxidized hydrocarbons, in the later effluent fractions it is mainly unsaponifiable oxidized material. Each effluent material can be saponified and the saponified material separated from the unsaponifiable material.

The solvent-free fractions obtained from the two intermediate effluent fractions removed through lines 19 and 20 have highly advantageous properties. For use in saponified form as soluble oil constituents, they are generally superior to the solvent-free fraction obtained from the first effluent fraction, the high viscosity of the latter solvent-free fraction being a disadvantage in such use. They are also generally superior to the last effluent material since the latter contains more highly oxygenated products of oxidation, which products are inferior for use in soluble oils.

It is not known whether the effluent from line 19 contains less viscous saponifiable materials than the effluent from line 20, or whether the lower viscosity of the line 19 effluent is attributable to the unsaponifiable materials therein. The low viscosity of the line 20 effluent, as compared with the line 23 effluent, is probably attributable to lower viscosity saponifiable materials.

After the isopropanol fractions have been removed, additional charge material may be introduced into the adsorbent to begin a new cycle of operation. However, since the isopropanol is quite strongly adsorbed on the adsorbent, it is generally preferable to remove the isopropanol with a desorbent or desorbents, e.g. acetone and benzene in that order, having adsorption index intermediate between isopropanol and the charge material, before reintroducing the charge material.

It is to be understood that more than four effluent fractions, and up to any desired number, can be separately removed from treating zone 16. On the other hand, it is not necessary to take as many as four fractions. There should be at least two fractions, however: a first fraction containing high molecular weight saponifiable material and a second fraction containing lower molecular weight saponifiable material.

It is not necessary to use three different desorbents. For example, hexane or other liquid aliphatic hydrocarbon could be used to desorb the first and intermediate fractions and isopropanol or other oxygen-containing liquid solvent to desorb the last fraction. Alternatively, a single desorbent, e.g. one having adsorption index from 30 to 200, could be used to desorb all three fractions. Adsorption indexes of various desorbents are disclosed in U.S. Patent 2,585,490 to John L. Olsen.

The liquid oxidation product mixture removed from partial oxidation zone 10 through line 11 can, instead of being treated in its entirety with adsorbent, be separated first into saponifiable and unsaponifiable fractions thereof. Thus, the product mixture can be introduced through lines 11 and 30 into saponification zone 31, wherein it is saponified by alkaline material introduced through means not shown. The aqueous layer, containing soaps of the saponifiable material is removed through line 32, de-oiled by extraction with petroleum naphtha (not shown), and introduced into acidification zone 33 wherein neutralization of the soaps by mineral acid introduced through means not shown is effected.

De-oiled saponifiable oxidation products are removed through line 34, dissolved in hexane introduced through line 35, and are then introduced through lines 36 and 37 into treating zone 38. Hexane, acetone (adsorption index 185) and isopropanol are subsequently and separately added as desorbents in that order through lines 35, 39, and 40 respectively. Effluent fractions are removed through lines 41, 42, 43, and 44, the fractions corresponding generally to those removed from zone 16 through lines 23, 19, 20, and 21, except that the fractions removed from zone 38 are substantially free from unsaponifiable constituents of the oxidation product mixture.

After the isopropanol fractions are removed, additional charge material may be re-introduced, preferably with intermediate washing of the adsorbent by means of a desorbent or desorbents, e.g. acetone and benzene in that order, having adsorption index intermediate between isopropanol and the charge material.

Generally the same requirements and preferred conditions apply to a treatment of saponifiable oxidation products alone as to treatment of the entire oxidation product mixture.

The oily layer from saponification zone 31 contains unsaponifiable constituents of the oxidation product mixture. This layer is removed through line 50, dissolved in hexane introduced through line 51, and introduced through lines 52 and 53 into treating zone 54 containing a compact bed of silica gel. If desired, the oily material extracted from the aqueous layer can be admixed with the oily layer prior to introduction into zone 54.

Hexane, benzene, and isopropanol are introduced as desorbents through lines 51, 55, and 56 respectively into zone 54, after introduction of the charge material through lines 52 and 53. Effluent material is withdrawn from zone 54 through lines 57 and 58, then through lines 57 and 59, then through lines 57 and 60, and then through lines 57 and 61. The effluent removed through line 58 comprises mainly a solution of unoxidized hydrocarbon material in hexane. The effluent removed through line 59 comprises mainly a solution of unsaponifiable oxidized material in benzene, though some unoxidized hydrocarbon material may also be present. The first benzene fraction may contain only small amounts of materials having high hydroxyl number, but relatively large amounts of materials having high carbonyl number. The effluent removed through line 60 comprises mainly a solution of more strongly adsorbed unsaponifiable oxidized material in benzene. The effluent removed through line 61 comprises mainly a solution of still more strongly adsorbed unsaponifiable oxidized material in isopropanol.

It is to be understood that more than four effluent fractions, and up to any desired number, could be removed from zone 54. Also, if desired, only two fractions could be removed, in which case it would be advisable to use only two desorbents, e.g. an aliphatic hydrocarbon for the unoxidized hydrocarbons and an oxygenated organic liquid for the unsaponifiable oxidized material. It would also be possible to use as sole desorbent a material having adsorption index from 30 to 200, the first effluent fraction or fractions containing unoxidized hydrocarbons dissolved in desorbent and the later effluent fraction or fractions containing unsaponifiable oxidized material dissolved in desorbent.

Figure 2 shows the saponification numbers and relative viscosities of various fractions obtained in a treatment according to the invention of an oxidation product mixture such as that treated in zone 16 of Figure 1, hexane, benzene, and isopropanol being used as desorbents in that order. Figure 2 shows that the first hexane fraction, e.g. that removed through line 23 of Figure 1, has high viscosity and high saponification number, that the second hexane fraction has much lower viscosity and fairly high though decreasing saponification number, that the benzene fraction has saponification number increasing to a high level and has relatively low viscosity, and that the isopropanol fraction has fairly high saponification number and fairly low viscosity.

Figure 3 shows the carbonyl numbers and hydroxyl numbers of various fractions obtained in a treatment according to the invention of unsaponifiable oxidation products such as those treated in zone 54 of Figure 1, hexane, benzene, and isopropanol being used as desorbents in that order. Figure 3 shows that the hexane fraction has for the most part low hydroxyl number and carbonyl number, that the first benzene fraction has relatively low hydroxyl number and relatively high carbonyl number, and that the second benzene fraction and the isopropanol fraction have relatively high hydroxyl number as well as carbonyl number.

The absorbent used according to the invention is a solid oxide adsorbent, such as silica gel, aluminum oxide, activated alumina, bauxite, Attapulgus clay, Filtrol clay, fuller's earth, infusorial earth, calcium oxide, magnesia, etc. Other known solid, granular oxide adsorbents can be used.

Any suitable number of organic desorbents may be employed according to the invention. As previously indicated, a single desorbent having adsorption index from 30 to 200 may be used, in which case the cycle of materials contacted with the adsorbent is as follows:

Charge
Desorbent, index 30 to 200
Charge

Plural desorbents may be used. Preferred cycles of this kind are the following three-desorbent cycle:

Charge
1st desorbent, index 0 to 100
2nd desorbent, index 100 to 275
3rd desorbent, index 0 to 100
Charge and the following five-desorbent cycle:

Charge
1st desorbent, index 0 to 40
2nd desorbent, index 20 to 200
3rd desorbent, index 150 to 300
4th desorbent, index 20 to 200
5th desorbent, index 0 to 50
Charge In the three-desorbent cycle, the first and third desorbents may be the same or different. Similarly, in the five-desorbent cycle, the first and fifth may be the same or different, and the second and fourth may be the same or different. Preferably, the second desorbent has higher adsorption index than the first, the third higher than the second and fourth, and the fourth higher than the fifth.

Any suitable odd or even number of desorbents may be used. When a plurality are used, they may either be added consecutively to the adsorbent, or they may be added in admixture with one another, in which case the less strongly adsorbed desorbent passes through the adsorbent more readily and becomes in effect the first desorbent of the mixture, the more strongly adsorbed desorbent becoming the second desorbent of the mixture.

Adsorption index, as defined in U.S. Patent 2,441,572, to Alfred E. Hirschler, is the apparent number of cubic centimeters of the material in question which is adsorbed at equilibrium conditions by 1 kilogram of a compact bed of the adsorbent from a 0.2% solution of the material in isooctane.

Examples of suitable desorbents for use according to the invention are hydrocarbons, preferably having 3 to 12 carbon atoms, e.g. propane, butanes, hexanes, octanes, decanes, benzene, toluene, xylenes, cumene, naphthalene, methyl naphthalenes, cyclohexane, cyclohexene, etc.; aliphatic alcohols, preferably having not more than 12 carbon atoms, e.g. methanol, ethanol, propanols, butanols, hexanols, octanols, decanols, butanediols, hexanediols, decanediols, etc.; organic acids, preferably having not more than 12 carbon atoms, e.g. formic, acetic, propionic, benzoic, phenylacetic, etc.; aromatic alcohols such as benzyl alcohol, phenylethyl alcohol, etc.; chlorinated hydrocarbons such as trichloroethylene, chloropentanes, chloroform, chlorobenzene, methylene chloride, propylbromides, tetrachlorethane, ethylene dichloride, benzyl chloride, chlorbutanes, etc.; and other solvents such as aliphatic ketones having 2 to 12 carbon atoms, pyridine, morpholine, aldehydes, ethers, etc.

Any suitable manner of contacting the oxidation product mixture and the desorbent or desorbents with the adsorbent can be used. In the preceding description of the drawing, a percolation technique was disclosed. Alternatively, the adsorbent can be transported through various zones, contacting the various liquid materials in the proper order during such transportation.

The following examples illustrate the invention:

Example 1

An oxidation product mixture obtained from liquid phase partial oxidation of petroleum foots oil was contacted with silica gel to adsorb constituents of the mixture on the gel, and the latter was then contacted with organic solvent desorbents to obtain desorbate fractions containing various constituents of the products mixture.

The foots oil which was oxidized had been prepared by solvent de-waxing of a furfural-refined naphthenic-base lubricating oil to obtain slack wax, and solvent de-oiling of the slack wax to to obtain the foots oil as a by-product. The foots oil contained about equal parts of oil and low-melting wax, had average molecular weight of about 436, contained about 90 weight percent of saturated hydrocarbons, and had an average of about 1.5 naphthene rings per molecule in the saturated portion.

The oxidation was conducted at about 250° F. and atmospheric pressure by blowing air through the foots oil in the presence of manganese naphthenate in amount to provide 0.04 weight percent of manganese in the oxidation charge. The oxidation was continued until the saponification number of the liquid material in the oxidation zone was 87 mg. of KOH per gram.

100 grams of the total liquid oxidation product mixture were dissolved in 100 ml. of n-hexane and percolated through a bed containing 600 grams of silica gel prewetted with 300 ml. of hexane. When the product mixture and hexane had all been introduced into the bed, 800 ml. of additional hexane were introduced into the bed, followed by 700 ml. of benzene, and then by 1500 ml. of isopropanol.

17 effluent fractions were removed from the bed, 8 of these fractions containing mainly hexane as solvent, 6 of them containing mainly benzene as solvent, and 3 of them containing mainly isopropanol as solvent. The hexane fractions contained about 72 weight percent of the original oxidation product charge material; the benzene fractions contained about 11 weight percent of the charge; the isopropanol fractions contained about 14 weight percent of the charge; about 3 weight percent of the charge remained adsorbed on the gel. Solvent was stripped from each of the effluent fractions to obtain as residual product the substantially solvent-free constituents of the original charge. The viscosities of the residual products obtained from each of the various fractions were determined on a relative basis by measuring the time in minutes required at room temperature for a given amount of the product to run out of a pipet, the same pipet being used for all determinations.

The following table shows the saponification numbers and viscosities for the indicated products recovered from various fractions; the data is shown plotted in Figure 2, the lines being drawn through the mid-points of the fractions:

| Fraction | Weight percent of charge | Solvent | Sap. No. | Viscosity in min. |
|---|---|---|---|---|
| 1 | 0 – 6 | Hexane | 155 | >6 |
| 2 | 6 –17.3 | do | 109 | >6 |
| 3 | 17.3–29.5 | do | 95 | 5.62 |
| 4 | 29.5–42 | do |  | 1.96 |
| 5 | 42 –52 | do |  | 0.4 |
| 6 | 52 –60.5 | do | 65 | 0.2 |
| 7 | 60.5–68.5 | do | 22 | 0.16 |
| 8 | 68.5–72 | do | 11 | 0.12 |
| 9 | 72 –73.5 | Benzene |  | 0.2 |
| 10 | 73.5–75.5 | do |  |  |
| 11 | 75.5–78 | do | 69 | 0.72 |
| 12 | 78 –79 | do |  | 0.12 |
| 13 | 79 –80 | do |  | 0.16 |
| 14 | 80 –83 | do | 194 | 1.76 |
| 15 | 83 –91.5 | Isopropanol | 156 | 0.46 |
| 16 | 91.5–95 | do | 158 | 0.16 |
| 17 | 95 –97 | do | 159 | 0.2 |

This table shows that the least readily adsorbed material (0 to 42%) in the charge to the adsorption-desorption operation surprisingly has high saponification number and high viscosity. Thus it appears that high molecular weight carboxylic acids are contained in these first hexane fractions.

The 42 to 52 percent fraction has saponification number and viscosity roughly equivalent to the 75.5 to 80 percent range obtained with benzene as desorbent. These 42 to 52 and 75.5 to 80 percent fractions are generally more suitable for use in preparation of alkali metal soap emulsifiers for soluble oil than the higher viscosity fractions. Also, the products obtained from the isopropanol fractions are, because of the more highly oxygenated nature of these products, less suitable for such use than the 42 to 52 and 75.5 to 80 percent fractions.

*Example 2*

The oxidation product mixture described in Example 1 was saponified with an excess of caustic soda, and the saponification products were contacted with acqueous isopropanol and naphtha. Unsaponifiable material was recovered from the naphtha solution, and saponifiable material from the alcohol solution. 79 grams of the unsaponifiable material were dissolved in 75 ml. of hexane and percolated through a bed containing 215 grams of silica gel prewetted with 75 ml. of hexane. Then 250 ml. of hexane, 200 ml. of benzene, and 550 ml. of isopropanol were added in turn as desorbents. A plurality of fractions were recovered for each desorbent, and each fraction was stripped to remove desorbent. The properties of the residual products obtained from the various fractions were determined.

The following table shows the hydroxyl number and carbonyl number of the products obtained; the data are shown plotted in Figure 3:

| Fraction | Weight percent of charge | Solvent | Carbonyl No. | Hydroxyl No. |
|---|---|---|---|---|
| 1 | 0 –60 | Hexane | 5 | 8–10 |
| 2 | 60 –70 | do | | |
| 3 | 70 –73 | do | | |
| 4 | 73 –73.5 | do | | |
| 5 | 73.5–76 | Hexane and benzene | 57 | 17 |
| 6 | 76 –80 | Benzene | | |
| 7 | 80 –81.5 | do | 71 | 38 |
| 8 | 81.5–90.5 | do | 69 | 90 |
| 9 | 90.5–97 | Isopropanol | 74 | 91 |

This table shows that benzene is capable of desorbing from silica gel a substantial amount of the material having high carbonyl number and high hydroxyl number, such material presumably being ketonic and alcoholic in structure respectively. The materials desorbed by isopropanol were more strongly adsorbed materials, also presumably ketonic and alcoholic in structure.

It is noted that a sharp separation between unoxidized hydrocarbons and carbonyl-containing materials was obtained, since the 73.5 to 76 percent fraction had a carbonyl number of 57 as compared with the carbonyl number of 1 for the 70 to 73 percent fraction. Also, a sharp rise in hydroxyl number, from 38 to 90, occurred between the 80 to 81.5 percent fraction and the 81.5 to 90 percent fraction.

It is further noted that, since the sharp increase in carbonyl number occurs before the sharp increase in hydroxyl number, it is possible to separate to an extent the different types of oxygenated unsaponifiable materials. Thus, fraction 5, for example, is a concentrate of carbonyl-containing materials with relatively little hydroxyl-containing materials present.

The present invention is applicable generally to products obtained by liquid phase partial oxidation of petroleum hydrocarbon fractions such as wax, foots oil, lubricating oil, and lighter fractions, etc.

The invention claimed is:

1. Method for separating relatively high molecular weight saponifiable material from other constituents of a product mixture obtained by liquid phase partial oxidation of petroleum hydrocarbons and containing saponifiable constituents only of the products obtained in said oxidation, which comprises: contacting said product mixture with a solid granular oxide adsorbent; contacting said adsorbent and said product mixture with an organic desorbent having adsorption index for said adsorbent within the range from 0 to 200; separating organic desorbent containing said relatively high molecular weight saponifiable material in solution from said adsorbent; contacting said adsorbent with additional organic desorbent having adsorption index of at least 30 and at least as great as great as the first-named adsorption index; and separating the latter organic desorbent containing relatively low molecular weight saponifiable material in solution from said adsorbent.

2. Method for separating relatively high molecular weight saponifiable material from other constituents of a product mixture obtained by liquid phase partial oxidation of petroleum hydrocarbons which comprises: contacting said product mixture with a solid granular oxide adsorbent; contacting said adsorbent and said product mixture with an organic desorbent having adsorption index for said adsorbent within the range from 0 to 200; separating organic desorbent containing said relatively high molecular weight saponifiable material in solution from said adsorbent; contacting said adsorbent with additional organic desorbent having adsorption index within the range from 0 to 200 and at least as great as the first-named adsorption index; and separating the latter organic desorbent containing relatively low molecular weight saponifiable material in solution from said adsorbent.

3. Method according to claim 1 wherein the first-named desorbent has adsorption index in the range from 0 to 40, wherein said additional desorbent has adsorption index in the range from 20 to 200 and greater than the first-named adsorption index, wherein said adsorbent is contacted with a third desorbent having adsorption index in the range from 150 to 300 and greater than the second-named adsorption index, and wherein said third desorbent is separated from said adsorbent.

4. Method according to claim 2 wherein the first-named desorbent has adsorption index in the range from 0 to 40, wherein said additional desorbent has adsorption index in the range from 20 to 200 and greater than the first-named adsorption index, wherein said adsorbent is contacted with a third desorbent having adsorption index in the range from 150 to 300 and greater than the second-named adsorption index, and wherein said third desorbent is separated from said adsorbent.

5. Method according to claim 1 wherein the first-named desorbent is a saturated aliphatic hydrocarbon containing 3 to 12 carbon atoms.

6. Method according to claim 2 wherein the first-named desorbent is a saturated aliphatic hydrocarbon containing 3 to 12 carbon atoms.

7. Method according to claim 1 wherein said additional organic desorbent has adsorption index greater than the said first-named adsorption index.

8. Method according to claim 2 wherein said additional organic desorbent has adsorption index greater than the said first-named adsorption index.

9. Method according to claim 1 wherein said adsorbent is silica gel.

10. Method according to claim 1 wherein said petroleum hydrocarbons are a petroleum foots oil.

11. Method according to claim 2 wherein said adsorbent is silica gel.

12. Method according to claim 2 wherein said petroleum hydrocarbons are a petroleum foots oil.

(References on following page)

References Cited in the file of this patent

UNITED STATES PATENTS

| | | |
|---|---|---|
| 1,681,185 | James | Aug. 21, 1928 |
| 1,838,032 | Wiezevich et al. | Dec. 22, 1931 |
| 2,453,588 | Polly | Nov. 9, 1948 |
| 2,509,486 | Danforth | May 30, 1950 |
| 2,564,717 | Olsen | Aug. 21, 1951 |
| 2,579,847 | Murphy | Dec. 25, 1951 |
| 2,610,197 | Cunningham | Sept. 9, 1952 |
| 2,621,203 | Cope | Dec. 9, 1952 |
| 2,678,132 | Beard | May 11, 1954 |
| 2,696,304 | Gilmore | Dec. 7, 1954 |
| 2,712,008 | Kirchner | June 28, 1955 |